(12) United States Patent
Reid (10) Patent No.: US 7,561,713 B2
(45) Date of Patent: Jul. 14, 2009

(54) ELECTRO-ACOUSTIC DEVICE FOR CREATING PATTERNS OF PARTICULATE MATTER

(75) Inventor: John Reid, St. John's in the Vale (GB)

(73) Assignee: Sonic Age Limited, Keswick, Cumbria (GB)

( * ) Notice: Subject to any disclaimer, the term of this patent is extended or adjusted under 35 U.S.C. 154(b) by 410 days.

(21) Appl. No.: 10/567,456

(22) PCT Filed: Aug. 6, 2004

(86) PCT No.: PCT/GB2004/003426

§ 371 (c)(1),
(2), (4) Date: Mar. 29, 2006

(87) PCT Pub. No.: WO2005/015523

PCT Pub. Date: Feb. 17, 2005

(65) Prior Publication Data

US 2006/0165241 A1  Jul. 27, 2006

(30) Foreign Application Priority Data

Aug. 7, 2003  (GB)  ................................. 0318531.1

(51) Int. Cl.
*H04R 1/02* (2006.01)
*H04R 29/00* (2006.01)
(52) U.S. Cl. ........................................ 381/431; 381/59
(58) Field of Classification Search ................ 381/59, 381/150, 173, 408, 431; 181/141, 167; 367/140, 367/167
See application file for complete search history.

(56) References Cited

U.S. PATENT DOCUMENTS 2,782,632 A * 2/1957 Grimm et al. .................. 73/582
3,407,897 A   10/1968 Hans

FOREIGN PATENT DOCUMENTS

| FR | 1 565 390 | 5/1969 |
| FR | 2 308 156 | 11/1976 |
| JP | 6-112734 | 4/1994 |

OTHER PUBLICATIONS

International Search Report for PCT/GB2004/003426 dated Nov. 8, 2004.
"Cymatics" by Hans Jenny, Basilius Presse AG, Basel, 1967.
Andrade et al, Proc. Physc. Soc., vol. 43, pp. 405-411, May 1931.
Rossing, Am. J. Phys. 50(3), Mar. 1982, pp. 271-274.
United Kingdom Search Report dated Jan. 7, 2004, issued in connection with GB 0318531.1.

* cited by examiner

*Primary Examiner*—Brian Ensey
(74) *Attorney, Agent, or Firm*—Nixon & Vanderhye P.C.

(57) ABSTRACT

An electro-acoustic device for creating patterns of particulate matter comprises a housing (2) one end of which is closed and the other end of which is open, a diaphragm (10) extending across the housing (2) at or adjacent the open end of the housing to define and close a hollow interior to the housing, a mass of particulate matter (34) located on the diaphragm (10), and, within the hollow interior of the housing (2), an electro-acoustic transducer (26), the arrangement being such that, in use with the diaphragm (10) extending horizontally and on activation of the transducer (26) by an audio signal, the acoustic output therefrom excites the diaphragm (10) and creates a pattern in the particulate matter (34) thereon representative of the audio signal.

31 Claims, 4 Drawing Sheets

ELECTRO-ACOUSTIC DEVICE FOR CREATING PATTERNS OF PARTICULATE MATTER

This application is the US national phase of international application PCT/GB2004/003426 filed 6 Aug. 2004, which designated the U.S. and claims priority to GB 0318531.1 filed 7 Aug. 2003, the entire content of each of which is hereby incorporated by reference.

This invention relates to an electro-acoustic device for creating patterns of particulate matter each pattern being indicative of the harmonic structure of the particular audio signal fed to the device.

It is well established theory that the inherent harmonic structure of an audio signal can be rendered visible by exciting particulate matter to create a pattern associated with that signal.

For example, in 1785, E. F. P. Chladni demonstrated this modal phenomenon by exciting a brass plate carrying sand using a violin bow, resulting in the formation of sand patterns caused by the various modal flexions of the plate at the plate's natural frequencies.

Inspired by Chladni, In 1831, Michael Faraday repeated Chladni's experiments and went further to explore, in depth, what he called 'crispations'. These were modal patterns which formed using a variety of media, including sand, water, lycopodium and mercury, on glass plates, wooden planks etc.

In 1885, Hermann Helmholtz experimented with sand-strewn India-rubber membranes stretched over glass bottles excited by the power of voice alone, and this was repeated in 1904 by Margaret Watts-Hughes, the India-rubber membrane being stretched over a wooden vessel, vocal sounds entering a tube connected to the vessel.

Hans Jenny, a Swiss scientist, published a book entitled 'Kymatic' in 1967 in which he refers to a device which he named a 'Tonoscope' for creating vibrational patterns acoustically without any intermediate electro-acoustical unit.

To date, the value of being able to create patterns of particulate matter indicative of associated audio signals has not been fully appreciated, and it would be desirable to be able to provide an electro-acoustic device capable of creating such patterns and with a variety of practical applications.

According to the present invention there is provided an electro-acoustic device for creating patterns of particulate matter, the device comprising a housing one end of which is closed and the other end of which is open, a diaphragm extending across the housing at or adjacent the open end of the housing to define and close a hollow interior to the housing, a mass of particulate matter located on the diaphragm, and, within the hollow interior of the housing, an electro-acoustic transducer, the arrangement being such that, in use with the diaphragm extending horizontally and on activation of the transducer by an audio signal, the acoustic output therefrom excites the diaphragm and creates a pattern in the particulate matter thereon indicative of the structure of the audio signal.

Such a device has a multitude of applications and the audio signal triggering the patterns can be from any one of a variety of sources. For example the device can be used to teach the fundamentals of music and musicology with the audio signal being music in any one of a number of different forms, or can be used by speech therapy practitioners as a teaching aid for stroke victims, the deaf and the partially deaf, with the audio signal being derived from the human voice. Other applications will become apparent.

In a preferred embodiment of the invention, the upper end of the housing is closed by a transparent window overlying the diaphragm and through which the patterns in the particulate matter can be viewed.

Such a window reduces the escape of sound from the housing and reduces acoustic feedback whereby a wider range of sources, including 'live' microphones, can be used to activate the transducer.

Any problems associated with acoustic feedback can be further eliminated by mounting the housing in an outer enclosure, while the volume of air between the housing and the outer enclosure may be totally or partially evacuated.

In such an embodiment, it is preferred that elasticated suspension means are provided to assist in mechanically decoupling the housing and the outer enclosure, so suspending the housing within the outer enclosure that direct conduction of acoustic energy between the housing and the outer enclosure is reduced.

The diaphragm may comprise a tensioned sheet of elastic material such as pvc extending across the housing, the tension in which sheet may be pre-set or may be adjustable.

The electro-acoustic device preferably includes tensioning means for adjusting the tension of the diaphragm. Suitably, the tensioning means includes a plurality of tensioning devices so that the diaphragm can be tensioned evenly. For example, at least four, preferably at least six or eight tensioning devices are provided. In a preferred embodiment, twelve tensioning devices are provided.

Typically, the tensioning devices are associated with the diaphragm around the circumference of the diaphragm. The tensioning devices may be attachable directly to the diaphragm, for example where the tensioning device includes a tensioning wire and the wire is connected to the diaphragm via an eyelet or other fixing point, or indirectly, for example via gripping annuli.

Preferably the tensioning devices are spaced equally around the circumference of the diaphragm to ensure even tensioning.

The tensioning devices suitably include a tensioning member and an adjustment device. The tensioning member can be a wire, e.g. a steel wire, or a strap or webbing connectable to the diaphragm, and the adjustment device acts on the tensioning member so as to transmit a selected tension to the diaphragm.

The tensioning member may be connected to the diaphragm via apertures in the diaphragm, e.g. eyelets, or for example, by adhesives or stitching.

The adjustment device applies tension to the tensioning members. The adjustment device is typically fixed with respect to the housing of the electro-acoustic device. Tension can be applied to the tensioning members by shortening the length of tensioning member between the diaphragm and the adjustment device. For example, the adjustment device may include winding gear for winding the tensioning member to adjust its length. The adjustment means can include a tuning wheel or a tuning screw to operate the winding gear.

In order that the user can accurately monitor the tension of the diaphragm, the tensioning means preferably includes a tension gauge. Suitably, each of the plurality of tensioning devices includes a tension gauge. The tension gauge can be a spring gauge or other mechanical gauge. In this way it is possible to quantify the tension in each tensioning device.

In an embodiment, the tensioning means may include a plurality of tensioning rods attached to two gripping annuli which sandwich the periphery of the diaphragm. The tensioning rods are preferably connected to a central adjustment device that can apply tension to all the tensioning rods. For example, the adjustment device may include a threaded rod and a tuning wheel wherein rotation of the tuning wheel causes the threaded rods to move with respect to the tensioning rods so that tension is applied to the rods and hence the annuli. The variation in force applied to the annuli by the rods causes a change in tension in the diaphragm. For example, an increased gripping force between the annuli can tighten the diaphragm.

Preferably, the tensioning rods are spaced equally around the circumference of the diaphragm.

This arrangement is similar to the mechanical tuning apparatus used on orchestral drums.

The present invention also includes a method of tuning an electro-acoustic device as described herein. The method includes the steps of applying a tuning audio signal to the diaphragm, and adjusting the tensioning means so that the pattern formed on the diaphragm matches a predetermined tuning pattern associated with the tuning audio signal.

The predetermined tuning pattern can for example be provided as part of a set of tuning instructions.

Preferably the method includes a step of applying an initial tuning tension to the tensioning means prior to applying the tuning audio signal to the diaphragm.

The particulate matter is typically sized to between 250 and 1000 microns, and may be, for example, crushed quartz crystal or proprietary micro glass spheres.

The electro-acoustic transducer is conveniently a loudspeaker located coaxially within the housing with its acoustic output directed towards the underside of the diaphragm.

In an alternative embodiment of the invention, the housing may incorporate a waveguide arranged to feed an acoustic signal from the electro-acoustic transducer to be incident upon the upper or lower surface of the diaphragm.

Such an embodiment may further comprise means for projecting the patterns in the particulate material onto a viewing panel external of the housing.

The means for projecting the pattern may comprise a source of light within the hollow interior of the housing, a lens, preferably a flat fresnel lens, below the diaphragm, and a focusing lens above the diaphragm, the diaphragm being transparent.

In a further embodiment of the invention, the device includes a video camera located above the diaphragm and arranged to transmit signals to a remote viewing location whereby the patterns in the particulate matter can be viewed at said location.

BRIEF DESCRIPTION OF THE DRAWINGS

By way of examples only, embodiments of the invention will now be described in greater detail with reference to the accompanying drawings of which.

Figure 1A:
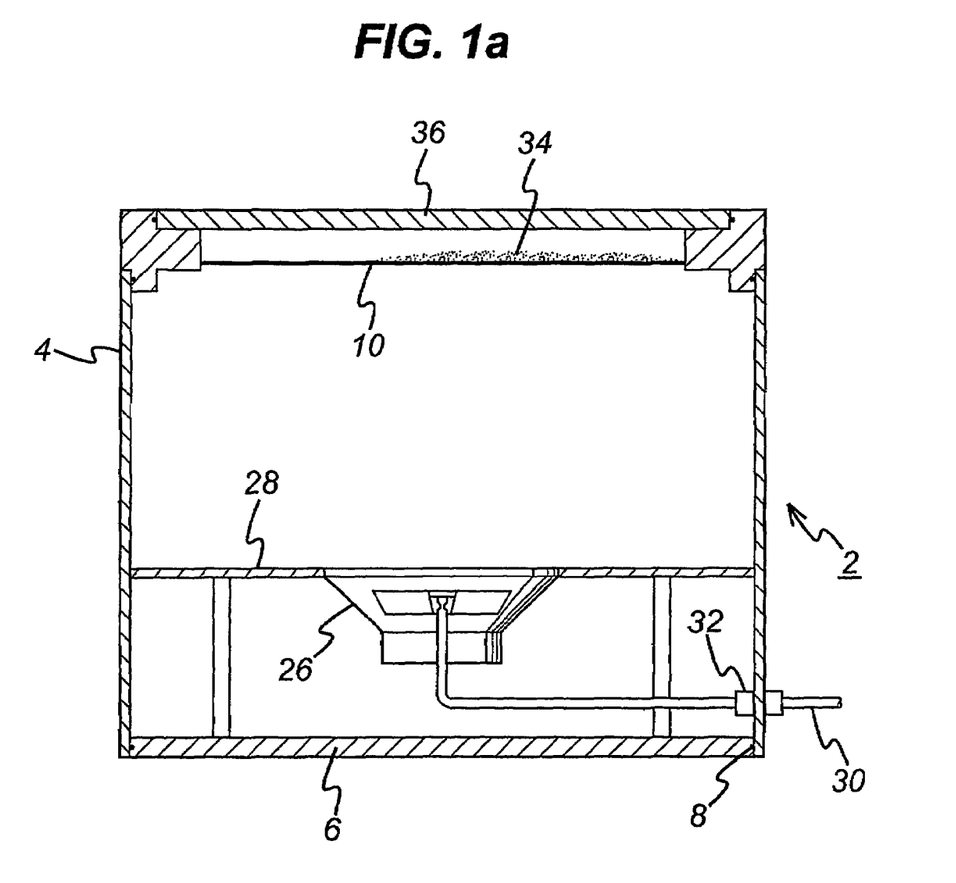
FIG. 1a is a vertical section through a first device according to the invention.

Referring to FIG. 1 there is shown a first device according to the invention comprising a housing indicated generally at 2 which is preferably of circular transverse section and of, for example, an acrylic plastic material which may be transparent or opaque.

The precise size and shape of the housing 2, its wall thickness and the material thereof are chosen to minimise acute natural resonances in the device on actuation thereof which may otherwise adversely affect the formation of consistent patterns in the particulate material. Curved housings generally perform better than angular housings in terms of natural resonances due to the manner in which wave fronts reflect off the internal surfaces of the housings.

The housing 2 comprises tubular member 4 the bottom end of which is closed by an acrylic disc 6 sealed in the tubular member 4 by an O-ring 8.

Figure 1B:
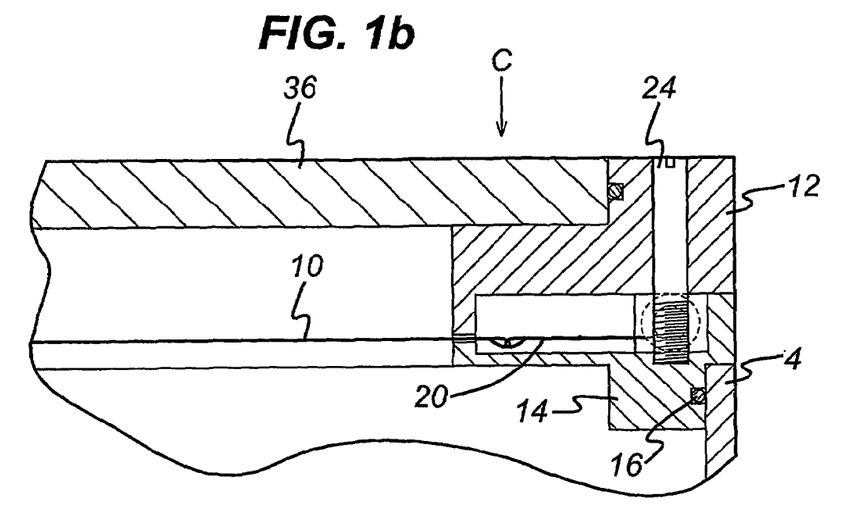
FIG. 1b is a detail of FIG. 1a to a larger scale.

A diaphragm 10, typically of pvc sheet material 0.2 mm thick is stretched across, to close, the upper end of the tubular member 4. More particularly upper and lower annular bezels 12,14 are mounted in the upper end of the tubular member 4 with an O-ring 16 reacting between the lower bezel 14 and the tubular member 4 to effect a sealing connection therebetween.

Figure 1C:
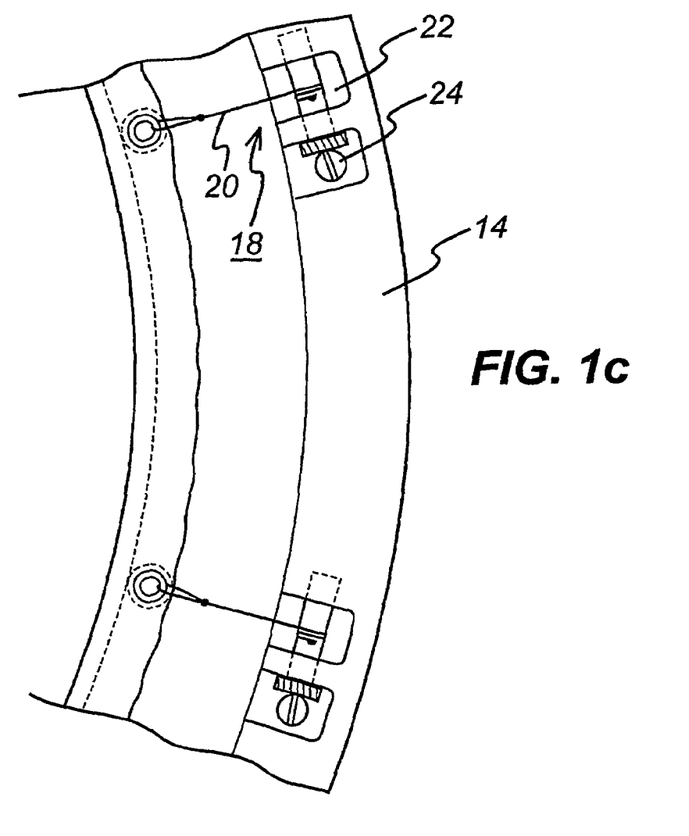
FIG. 1c is a view in the direction of arrow C in FIG. 1b (with the upper bezel removed)

The edge region of the diaphragm 10 is located between the upper and lower bezels 12,14 with a plurality, typically 12, tensioning devices 18 equally spaced around the tubular member 4 reacting between the diaphragm 10 and the bezels 12,14 to enable adjustment of the tension in the diaphragm 10.

Each tensioning device 18 comprises a length of steel wire 20 linked to the diaphragm 10, and a winding gear 22 incorporating a tuning screw 24 rotatable to draw the wire 20 around the winding gear 22 and to tension the diaphragm 10 accordingly.

The material of the diaphragm 10, in particular the density, thickness and stiffness of the material of the diaphragm 10, and the overall area of the diaphragm 10 are important factors in relation to the frequency range of sounds to be displayed/studied by the device. For example, smaller, stiffer diaphragms are easier to excite into higher frequency modes of resonance than larger, more elastic diaphragms, such larger, more elastic diaphragms being easier to excite into low frequency modes of resonance.

The overall tension in the diaphragm 10, together with the distribution of the tension, can be critical to operation of the device, effectively 'tuning' the device, especially if it is desirable that the modal patterns displayed are of archetypal form. Thus it is preferable to incorporate the above-described tensioning devices 18, which may be factory set at 20° C. and a pressure of 1010 millibars, whereby ambient temperature and local atmospheric pressure can be accommodated by adjustment of the tensioning devices 18.

Under certain circumstances, it may be necessary to perform adjustments to the device according to a specific protocol—for example exciting the diaphragm by applying a sinusoidal signal of a specific frequency to the transducer 26, the diaphragm 10 being tuned until a specific archetypal form is observed in the particulate matter.

Preferably, the tensioning on the membrane should be quantifiable by means of a spring gauge(s) or other form of torsion gauge.

In a simpler, more economic version of the device suitable for operation under temperature and pressure conditions within certain tolerances, the tension of the diaphragm 10 is pre-set in the factory, the diaphragm 10 being clamped between upper and lower bezels with no adjustment thereafter being possible.

An electro-acoustic transducer, for example a full range loudspeaker 26 is located within the housing 2 below the diaphragm 10, the loudspeaker being mounted on a baffle plate 28 to be coaxial with the tubular member 4 and the diaphragm 10 and to direct its acoustic output onto the underside of the diaphragm 10.

A feed cable 30 from an external source to the loudspeaker extends through an air-tight gland 32 in the tubular member 4.

The back pressure of the loudspeaker 26 is fully enclosed in an 'infinite baffle' arrangement so that:

a) natural transducer resonances tend to be dampened, thus helping to flatten the transducer's overall response. This ensures that the diaphragm 10 is excited with the minimum of resonant peaks (such peaks, if existing, would cause disproportionate excitation of the diaphragm and disrupt the expected modal patterns);

b) the escape of sound from the housing is reduced.

Although the spacing between the loudspeaker 26 and the diaphragm 10 is not critical, a distance based on the phi ratio (1:1.618) generally produces optimal results—i.e. for a diaphragm diameter of 10 units, the distance between the loudspeaker and the diaphragm is set at 6.18 units.

An exception to this rule is in scientific applications where, if patterns of shorter wavelengths are being studied, better results may be achieved with shorter distances or even by direct coupling of the loudspeaker with the diaphragm.

Particulate matter 34, for example crushed quartz crystal typically sieved to between 250 and 1000 microns, or proprietary glass spheres similarly sized, is sprinkled onto the diaphragm 10. The mass of the particulate matter 34 is a consideration depending upon the frequencies to be studied. For example, patterns resulting from low audio frequencies (e.g. frequencies up to 500 Hz) may be formed from almost any particulate matter, whereas patterns resulting from high frequencies (in the range 500 Hz –20 KHz) generally form better with lower mass particulates. This is because modes of vibration at higher frequencies cause progressively less excursion of the diaphragm as the frequency increases, due to their shorter wavelength. Thus only low mass particulate matter is transported to the nodal areas, and heavier particulate matter tends to remain stationery due to frictional forces. One method of countering this effect is to employ a separate high frequency transducer or tweeter arranged in an array with the main transducer. In so doing, greater sound pressure levels become available at these high frequencies, thus increasing excitation/excursion of the diaphragm at high frequencies.

The volume of the particulate matter is an important factor in the formation of patterns. Too great a volume prevents their proper formation, whereas too little may provide an incomplete pattern. The optimum volume of particulate matter is a function of the diaphragm area, and 1 cubic centimetre of particulate matter for every 200 square centimetres of diaphragm area has been found to be satisfactory.

A transparent acoustic window 36 is sealingly located in the upper bezel 12 and closes the upper end of the device to retain the particulate matter 34 on the diaphragm 10 and to reduce the escape of sound from the housing 2. A cavity of typically 20 mm between the upper surface of the diaphragm 10 and the underside of the window 36 is generally sufficient to allow free movement of the particulate matter 34 and to provide some reduction in sound escape. Without an acoustic window, use of a 'live' microphone as the source of sound becomes almost impossible due to acoustic feedback.

In order that patterns in the particulate matter 34 can be clearly seen, the particulate matter should have a high degree of colour contrast against that of the diaphragm. Colour dyed particulate matter can also be used—by sieving the particulate matter into grades and colour dying each grade in a given protocol of colours, the particulate matter becomes sorted by the exciting vibrations, causing colour fringing effects within the patterns.

Levelling of the diaphragm 10 is important, since the particulate matter 34 will gather towards one side of the diaphragm if the diaphragm is not horizontal. A spirit level of the bullseye type is generally adequate for this purpose, either as an integral feature of the device or as an accessory.

In use of the device, the loudspeaker 26 may be fed with a variety of pre-recorded audio signals, including voice, music and oscillator waveforms, all of which may be conveniently stored in solid state memory within an integrated or separate electronics section of the device. Alternatively, the device may be provided with sound bytes stored on Compact Disc or MiniDisc or other format of sound signal storage, which the user plays on an appropriate playback system, via a proprietary screened cable, or the sound bytes may be transmitted acoustically to the electronics section of the device and picked up via that section's internal microphone.

An external live microphone may also be employed with the device in order that voice sound patterns may be viewed, although care must be taken to ensure that the distance between the microphone and the housing 2 is carefully controlled in combination with the overall gain of the electronics section of the device. Otherwise acoustic feedback may occur.

It may be desirable initially to distribute the particulate matter evenly over the diaphragm by a deliberate noise pulse, in preparation for formation of a pattern. This could be achieved by typically a 1-second burst of pink noise, conveniently stored in solid state memory within the electronics section of the device and retrieved at the push of a button on a control panel of the electronics section. This burst of noise is fed to the transducer at a sufficient level to cause the particulate matter to randomise over the surface of the diaphragm.

In use, the described device creates patterns within the particulate matter 34 indicative of the harmonic structure of sound. The particulate matter 34 gathers in nodal areas on the tensioned diaphragm 10 which is excited into modes of acoustic vibration by incident sounds emitting from the loudspeaker 26.

When fed to the loudspeaker 26, simple sinusoidal waveforms create modal patterns of simple structure, while complex musical waveforms, which are rich in harmonics, produce complex patterns. The device generates patterns in a consistent manner provided the tuning of the diaphragm is in accordance with designed parameters.

The described device has numerous applications including:

Educational establishments, e.g. teaching the fundamentals of music and musicology;

Natural history museums, e.g. to display bird song patterns and land animal/aquatic mammal sound patterns;

Ancient history museums e.g. to display ancient musical instrument patterns;

Science museums e.g. helping to unravel the physical constants of the Cosmos via mathematical analysis of patterns, and displaying contemporary musical instrument patterns;

Entertainment in the home e.g. viewing patterns of sound bytes stored on Compact Disc, MiniDisc etc. and viewing voice sound patterns (provided some basic precautions are taken to minimise acoustic feedback).

Figure 2:
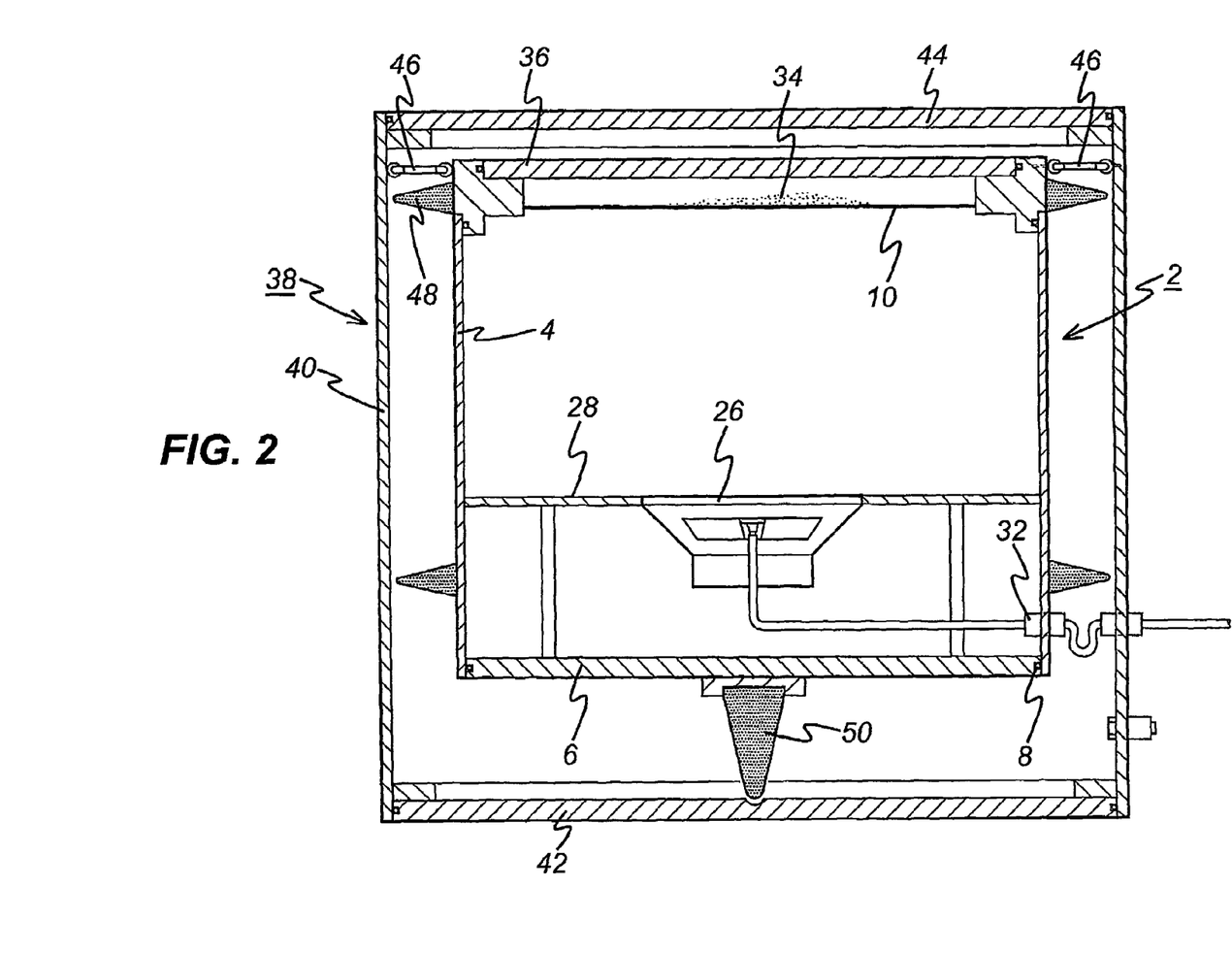
FIG. 2 is a vertical section through a second device according to the invention.

Referring to FIG. 2, there is shown a second device according to the invention in which the device of FIG. 1 is located in an outer enclosure 38 whereby acoustic feedback is further controlled by minimising the escape of sound from the housing 2. Such an arrangement enables the use of a 'live' microphone as the source of sound in all but the most extreme circumstances.

More particularly the enclosure 38 comprises a tubular member 40 and a base disc 42 sealed in one end thereof, the upper end of the tubular member 40 being closed by a transparent window 44. The tubular member 40 and disc 42 may be an opaque acrylic material, while the window 44 may be of glass or plastic. The enclosure 38 may be lined with an acoustically absorbent material in order further to enhance the enclosure's sound attenuation properties by reducing internal standing waves and reflections.

The housing 2 is suspended in the outer enclosure 38 in such a way that direct conduction of acoustic energy between the housing 2 and the outer enclosure 38 is minimised.

More particularly silicone rubber suspension members 46 circumferentially spaced about the upper regions of the housing 2 react between the housing 2 and the outer enclosure 38, with upper and lower sets of, typically, three foam rubber buffers 48 being circumferentially spaced about the housing 2, and an acoustic foam support cone 50 being provided on the disc 6 to seat in an associated indent in the disc 42.

The annular cavity between the tubular members 4,40 is typically about 50 mm wide, while the spacing between the windows 36 and 44 is kept to a minimum to maximise vision of the diaphragm 10. This spacing between the windows 36 and 44 is not critical to the sound attenuation properties of the device, as the windows 36,44 are each of substantial thicknesses, typically 12 mm.

The outer enclosure 38 of the device of FIG. 2 thus acts as an acoustic screen whereby, when the loudspeaker 26 is fed with live microphone signals, acoustic feedback is much reduced compared with the device of FIG. 1. Voice sound patterns are thus easily formed without the necessity to take particular care over the proximity of microphone and transducer.

Applications for the device of FIG. 2 include:

Speech therapy practitioners, for example as a teaching aid for stroke victims, the deaf and partially deaf; patients are able to 'see' the sounds they make with almost no interference from acoustic feedback;

Vocal coaching, either self taught or teacher taught, where it is desirable for a vocalist to perfect, for example, vowel sound annunciation;

Overtoning practitioners, i.e. the art of creating vocal harmonics; the device of FIG. 2 permits the creation and study of such harmonics in a visual form.

If the volume of air between the housing 2 and the outer enclosure 38 of the device of FIG. 2 is partially or totally evacuated, the attenuating properties of the outer enclosure 38 are further increased whereby voice sound patterns can be created from whispers or very quiet sounds.

Even partial evacuation has a significant effect in reducing sound leakage, the higher the evacuation the greater become the attenuation properties of the enclosure 38.

For any given device, there will be an optimum value to the evacuation dependent upon the precise properties of the materials employed and the constructional method adopted in the manufacture of the device.

Figure 3:
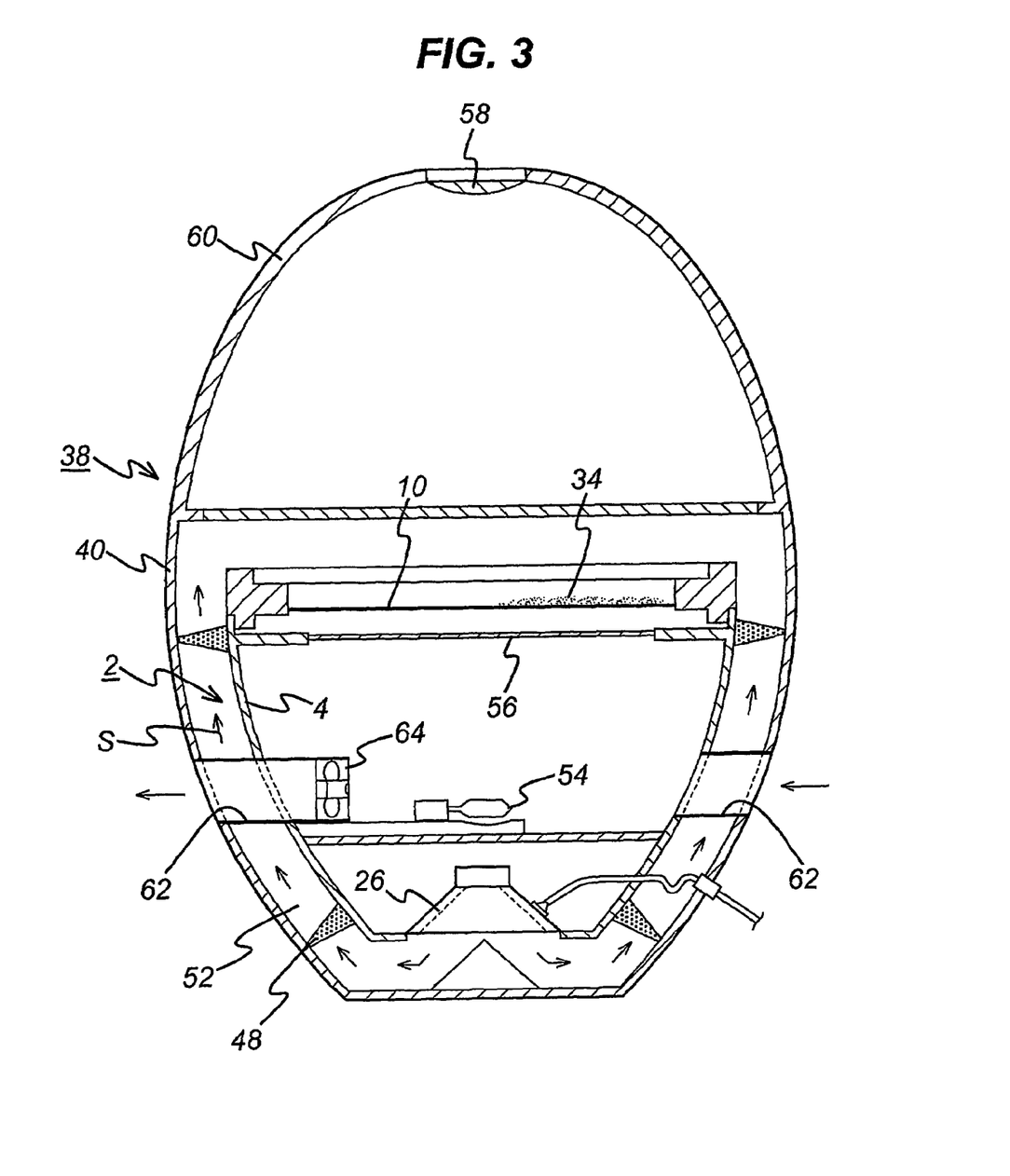
FIG. 3 is a vertical section through a third device according to the invention.

FIG. 3 illustrates a modified device which may embody the device of either FIG. 1 or FIG. 2, and which enables the patterns of particulate matter on the diaphragm 10 to be projected onto the ceiling, a wall or a dedicated screen, thus rendering the patterns visible without direct ocular vision of the diaphragm 10 and enabling viewing of the patterns by large numbers of people.

Referring to FIG. 3, in which components equivalent to those of FIGS. 1 and 2 are similarly referenced, the housing 2 and the outer enclosure 38 are generally bowl shaped with the tubular members 4,40 defining a waveguide 52 feeding to the upper surface of the diaphragm 10, which is transparent. The loudspeaker 26 feeds downwardly to propagate sound through the waveguide 52 as indicated by the arrows S, around the upper and lower bezels to be focused onto the diaphragm 10.

A light source 54 is located within the lower regions of the housing 2 above the loudspeaker 26, and a flat fresnel lens 56 is positioned under the diaphragm 10. There is a spacing of typically 10 to 20 mm between the lens 56 and the diaphragm 10 to prevent contact between the diaphragm 10 and the lens 56 on actuation of the device.

A focusing lens 58 is arranged above the diaphragm 10, typically carried by three curved spaced support members 60 formed by extensions of the tubular member 40.

Thus, on actuation of the device to create patterns in the particulate matter 34, light from the source 54 passes through the lens 56, and through the diaphragm 10 to be focused by the lens 58. The image may be incident on an optional/removable/adjustable mirror (not shown) and projected onto the wall or a dedicated screen. Alternatively, without the mirror, the patterns can be projected onto the ceiling.

The interior of the housing 2 may be ventilated by providing a pair of horizontal metal tunnels 62 one to each side of the light source 54 each passing through the waveguide 52 which is suitably protected with heat insulation sleeves to ensure that the temperature of the metal does not distort the material of the tubular members 4,40. One end of one tunnel 62 acts as an air intake, and a fan/air filter combination 64 feeds air past the light source 54 and out through the other tunnel 62.

In an alternative embodiment of the invention for enabling viewing of the patterns remotely and by a large number of people, a video camera is arranged above the diaphragm 10 of a device according to FIGS. 1 and 2, and the signal from the camera is either fed via a closed circuit to a proprietary monitor, projector or other display device, or is transmitted via conventional television.

Thus there is provided a device capable of creating a variety of patterns in particulate material in accordance with audio signals fed to an electro-acoustic component within the device and whereby the patterns are indicative of the harmonic structure of the signal in question.

In a further alternative embodiment of the invention, video or cinematograph moving images of modal patterns may be viewed. By sampling a recorded sound track, typically every $\frac{1}{25}$ second, then time stretching the samples to, say, 5 seconds, the modal patterns representing such samples may be created, employing any embodiment of the invention, FIGS. 1, 2 or 3, and video recorded or cinematographically filmed, sequentially frame by frame. Such a procedure creates a moving pattern for the eye when replayed at not less than 25 frames per second and when viewed in synchronism with the recorded sounds, enhances the pleasure of listening, the visual element being indicative of the harmonic structure of the recorded sounds.

In a more advanced embodiment of the invention, computer accessed versions of modal patterns, initially derived by digitising and storing the modal phenomena of a wide range of audio signals, as displayed on any of the embodiments of the invention, FIGS. 1, 2 or 3, can be viewed in real time on, for example, a cathode ray tube, computer monitor, LCD screen, plasma monitor, video projector or hand-held display device. Sound from a live or recorded source is converted by a microphone into a representative electrical audio signal. The signal is fed to an analogue-to-digital converter, whereupon it is processed by a computer at a sampling rate of, typically, not less than 25 times per second. The wave form of the sound sample is compared with waveforms of all sound samples stored in the computer's memory and the nearest match is identified. This match triggers release from computer memory of the digitised image of the modal pattern associated with that stored sound sample. Thus, a moving set of patterns is seen by the viewer in synchronism with the recorded or live sound source.

Alternatively or additionally, a pre-recorded digital source is used to generate a waveform which is compared to waveforms stored in the computer's memory.

The digital source can be a CD, DVD or solid state memory. The device may include means for playing a removable digital medium such as CD, DVD or memory card. Alternatively or additionally the device may include connecting means for connection to a digital source. Preferably, the device includes memory for storing digital sound files.

The device may include display means for displaying the digitised image of the modal patterns, for example an LCD screen. The device may include a colour screen and preferably means for providing colour enhancement to the modal patterns.

In some embodiments the device is a handheld device. The device may include a battery, preferably a rechargeable battery, so that it can be used on the move. The device may include an integral microphone. In such an embodiment, users can enjoy viewing moving modal patterns in a concert hall or in their own home, or on the move.

The invention claimed is:

1. An electro-acoustic device for creating patterns of particulate matter, the device comprising a housing one end of which is closed and the other end of which is open, a diaphragm extending across the housing at or adjacent the open end of the housing to define and close a hollow interior to the housing, a mass of particulate matter located on the diaphragm, and, within the hollow interior of the housing, an electro-acoustic transducer, the arrangement being such that, in use with the diaphragm extending horizontally and on activation of the transducer by an audio signal, the acoustic output therefrom excites the diaphragm and creates a pattern in the particulate matter thereon indicative of the audio signal.

2. A device as claimed in claim 1 in which the diaphragm comprises a tensioned sheet of elastic material extending across the housing.

3. A device as claimed in claim 2 in which the tension in the sheet is adjustable.

4. A device as claimed in claim 3, including tensioning means for tensioning and tuning the diaphragm.

5. A device as claimed in claim 1 in which the particulate matter is sized to between 250 and 1000 microns.

6. A device as claimed in claim 5 in which the particulate matter is crushed quartz crystal.

7. A device as claimed in claim 1 in which the electro-acoustic transducer is a loudspeaker located coaxially within the housing with its acoustic output directed towards the underside of the diaphragm.

8. A device as claimed in claim 1 and including a video camera located above the diaphragm and arranged to transmit signals to a remote viewing location whereby the patterns in the particulate matter can be viewed at said location.

9. A device as claimed in claim 1 including means whereby moving images of modal patterns, representative of a recorded sound track, may be viewed in synchronism with the sound track.

10. An electro-acoustic device for creating patterns of particulate matter, the device comprising a housing one end of which is closed and the other end of which is open, a diaphragm extending across the housing at or adjacent the open end of the housing to define and close a hollow interior to the housing, a mass of particulate matter located on the diaphragm, and, within the hollow interior of the housing, an electro-acoustic transducer, the arrangement being such that, in use with the diaphragm extending horizontally and on activation of the transducer by an audio signal, the acoustic output therefrom excites the diaphragm and creates a pattern in the particulate matter thereon indicative of the audio signal,
the upper end of the housing being closed by a transparent window overlying the diaphragm and through which the patterns in the particulate matter can be viewed.

11. A device as claimed in claim 10 in which the housing is mounted in an outer enclosure.

12. A device as claimed in claim 11 in which the volume of air between the housing and the outer enclosure is totally or partially evacuated.

13. A device as claimed in claim 12 in which elasticated suspension means react between the housing and the outer enclosure to suspend the housing within the outer enclosure.

14. A device as claimed in claim 10 in which the diaphragm comprises a tensioned sheet of elastic material extending across the housing.

15. A device as claimed in claim 14 in which the tension in the sheet is adjustable.

16. A device as claimed in claim 15, including tensioning means for tensioning and tuning the diaphragm.

17. A device as claimed in claim 10 in which the particulate matter is sized to between 250 and 1000 microns.

18. A device as claimed in claim 17 in which the particulate matter is crushed quartz crystal.

19. A device as claimed in claim 10 in which the electro-acoustic transducer is a loudspeaker located coaxially within the housing with its acoustic output directed towards the underside of the diaphragm.

20. A device as claimed in claim 10 including means whereby moving images of modal patterns, representative of a recorded sound track, may be viewed in synchronism with the sound track.

21. An electro-acoustic device for creating patterns of particulate matter, the device comprising a housing one end of which is closed and the other end of which is open, a diaphragm extending across the housing at or adjacent the open end of the housing to define and close a hollow interior to the housing, a mass of particulate matter located on the diaphragm, and, within the hollow interior of the housing, an electro-acoustic transducer, the arrangement being such that, in use with the diaphragm extending horizontally and on activation of the transducer by an audio signal, the acoustic output therefrom excites the diaphragm and creates a pattern in the particulate matter thereon indicative of the audio signal,
the housing incorporating a waveguide arranged to allow the acoustic output from the electro-acoustic transducer to be incident upon the upper or lower surface of the diaphragm.

22. A device as claimed in claim 21 and further comprising means for projecting the patterns in the particulate matter onto a viewing panel external of the housing.

23. A device as claimed in claim 22 in which the means for projecting the pattern comprise a source of light within the hollow interior of the housing, a flat fresnel lens below the diaphragm, and a focusing lens above the diaphragm, the diaphragm being transparent.

24. An electro-acoustic device for creating patterns of particulate matter, the device comprising a housing one end of which is closed and the other end of which is open, a diaphragm extending across the housing at or adjacent the open end of the housing to define and close a hollow interior to the housing, a mass of particulate matter located on the diaphragm, and, within the hollow interior of the housing, an electro-acoustic transducer, the arrangement being such that, in use with the diaphragm extending horizontally and on activation of the transducer by an audio signal, the acoustic output therefrom excites the diaphragm and creates a pattern in the particulate matter thereon indicative of the audio signal, the diaphragm comprising an adjustable tensioned sheet of elastic material extending across the housing, said device further comprising a plurality of tensioning devices spaced equally around the periphery of the diaphragm for tensioning and tuning the diaphragm.

25. An electro-acoustic device for creating patterns of particulate matter, the device comprising a housing one end of which is closed and the other end of which is open, a diaphragm extending across the housing at or adjacent the open end of the housing to define and close a hollow interior to the housing, a mass of particulate matter located on the diaphragm, and, within the hollow interior of the housing, an electro-acoustic transducer, the arrangement being such that, in use with the diaphragm extending horizontally and on activation of the transducer by an audio signal, the acoustic output therefrom excites the diaphragm and creates a pattern in the particulate matter thereon indicative of the audio signal, said device further including means whereby individual computer-stored modal patterns, may be accessed from memory in real time and viewed as moving modal patterns, on a visual display, representative of and in synchronism with the sound track.

26. A device as claimed in claim 25 in which the particulate matter is sized to between 250 and 1000 microns.

27. A device as claimed in claim 26 in which the particulate matter is crushed quartz crystal.

28. A device as claimed in claim 25 in which the electro-acoustic transducer is a loudspeaker located coaxially within the housing with its acoustic output directed towards the underside of the diaphragm.

29. A device as claimed in claim 25 including means whereby moving images of modal patterns, representative of a recorded sound track, may be viewed in synchronism with the sound track.

30. An electro-acoustic device for creating patterns of particulate matter, the device comprising a housing one end of which is closed and the other end of which is open, a diaphragm extending across the housing at or adjacent the open end of the housing to define and close a hollow interior to the housing, a mass of particulate matter located on the diaphragm, and, within the hollow interior of the housing, an electro-acoustic transducer, the arrangement being such that, in use with the diaphragm extending horizontally and on activation of the transducer by an audio signal, the acoustic output therefrom excites the diaphragm and creates a pattern in the particulate matter thereon indicative of the audio signal, said device further comprising means whereby moving images of computer-stored modal patterns, representative of a live sound performance, may be viewed in real time, during progress of the performance.

31. A method of tuning an electro-acoustic device for creating patterns of particulate matter, the device comprising a housing one end of which is closed and the other end of which is open, a diaphragm extending across the housing at or adjacent the open end of the housing to define and close a hollow interior to the housing, a mass of particulate matter located on the diaphragm, and, within the hollow interior of the housing, an electro-acoustic transducer, the arrangement being such that, in use with the diaphragm extending horizontally and on activation of the transducer by an audio signal, the acoustic output therefrom excites the diaphragm and creates a pattern in the particulate matter thereon indicative of the audio signal, which method includes the steps of applying a tuning audio signal to the diaphragm, and adjusting the tensioning means so that the pattern formed on the diaphragm matches a predetermined tuning pattern associated with the tuning audio signal.

\* \* \* \* \*